United States Patent
Yamazaki et al.

(10) Patent No.: US 6,863,303 B2
(45) Date of Patent: Mar. 8, 2005

(54) HYBRID INFLATOR

(75) Inventors: Masayuki Yamazaki, Hyogo (JP); Eiichi Ryobo, Hyogo (JP)

(73) Assignee: Daicel Chemical Industries, Ltd., Osaka (JP)

( * ) Notice: Subject to any disclaimer, the term of this patent is extended or adjusted under 35 U.S.C. 154(b) by 183 days.

(21) Appl. No.: 10/130,252

(22) PCT Filed: Nov. 21, 2001

(86) PCT No.: PCT/JP01/10182
§ 371 (c)(1), (2), (4) Date: Jul. 16, 2002

(87) PCT Pub. No.: WO02/42126
PCT Pub. Date: May 30, 2002

(65) Prior Publication Data
US 2004/0100079 A1 May 27, 2004

(30) Foreign Application Priority Data
Nov. 22, 2000 (JP) ........................ 2000-356601

(51) Int. Cl.[7] .............................................. B60R 21/30
(52) U.S. Cl. ..................................................... 280/736
(58) Field of Search ................................ 280/736, 737, 280/741, 742

(56) References Cited

U.S. PATENT DOCUMENTS

| | | | | |
|---|---|---|---|---|
| 5,668,345 A | | 9/1997 | Schroeder et al. | |
| 5,788,275 A | * | 8/1998 | Butt et al. | 280/737 |
| 6,068,292 A | * | 5/2000 | Renz | 280/737 |
| 6,116,643 A | | 9/2000 | Katsuda et al. | |
| 6,170,868 B1 | * | 1/2001 | Butt et al. | 280/737 |
| 6,234,523 B1 | * | 5/2001 | Tokoro et al. | 280/737 |
| 6,253,683 B1 | * | 7/2001 | Fukabori | 102/530 |
| 6,488,310 B1 | * | 12/2002 | Ryobo et al. | 280/736 |

FOREIGN PATENT DOCUMENTS

| | | |
|---|---|---|
| EP | 0673809 A1 | 9/1995 |
| JP | 08-282427 A | 10/1996 |
| JP | 3037059 U | 2/1997 |
| JP | 10-315897 A | 12/1998 |
| JP | 11-217054 A | 8/1999 |
| JP | 2001-163170 A | 6/2001 |
| JP | 2001-219809 A | 8/2001 |

* cited by examiner

Primary Examiner—Faye M. Fleming
(74) Attorney, Agent, or Firm—Birch, Stewart, Kolasch & Birch, LLP

(57) ABSTRACT

A hybrid inflator has flame-transferring holes 118 which allow outflow of a booster gas, and first communication holes 125 which allow outflow of a combustion gas are arranged in the same position in the longitudinal direction of the hybrid inflator to render smooth outflow of the booster gas and the combustion gas.

24 Claims, 5 Drawing Sheets

(a)

(b)

HYBRID INFLATOR

This application is the national phase under 35 U.S.C. § 371 of PCT International Application No. PCT/JP01/10182 which has an International filing date of Nov. 21, 2001, which designated the United States of America.

BACKGROUND OF THE INVENTION

1. Field of the Invention

This invention relates to an inflating-type safety system of motor vehicles, and more particularly to a hybrid inflator capable of inflating an air bag rapidly and unfailingly and an air bag system using the same inflator.

2. Description of Related Art

With the development of an inflator for an inflating-type safety system of motor vehicles, a hybrid inflator using both a pressurized gas and a solid gas generating agent is attracting attention. A main design requirement for a hybrid inflator is that the inflator inflates an air bag by a predetermined amount in a predetermined time so that the air bag is effectively activated. Various proposals concerning a structure to meet the requirement have heretofore been made (for example, as referred in JP-A8-282427). In order to secure safety of an occupant, it is important for such a hybrid inflator to inflate the air bag unfailingly.

SUMMARY OF THE INVENTION

An object of the present invention is to provide a hybrid inflator which is highly reliable when used for an air bag system and an air bag system using the same inflator.

The present invention may be employed in a single type, an inflator provided with one gas generating chamber, as well as a dual type, an inflator provided with two gas generating chambers.

The present invention provides, as a means for solving a problem, a hybrid inflator for an inflating-type safety system of a vehicle provided with an airbag, comprising an inflator housing, a gas generator accommodated in the inflator housing, and an ignition means chamber provided with ignition means connected to the gas generator, a pressurized medium containing an inert gas charged inside the inflator housing, wherein an outer shell of the gas generator is constituted by a gas generator housing, the gas generator housing includes a charge-transferring chamber formed inside a cylindrical charge-transferring chamber housing provided longitudinally in an extension of the ignition means and a gas generating chamber defined by the charge-transferring chamber housing and the gas generator housing and stores gas generating means;

the charge-transferring chamber housing has a plurality of flame-transferring holes provided at intervals in the longitudinal direction to make the charge-transferring chamber and the gas generating chamber communicate with each other, and the gas generating chamber has a plurality of communication holes communicating the interior of inflator housing; and at least some of a plurality of the flame-transferring holes and the communication holes are arranged not to face each other opposingly in the longitudinal direction.

If some or all of the flame-transferring holes and the communication holes are arranged not to face each other opposingly in the longitudinal direction of the hybrid inflator in the above manner, a booster gas flowing from the charge-transferring chamber moves the longer distance and may contact with more gas generating means as compared with a case where all of the flame-transferring holes and the communication holes are arranged to face each other oppositely, and thereby the gas generating means can be burnt more uniformly.

The present invention provides, as other means for solving a problem, a hybrid inflator for an inflating-type safety system of a vehicle provided with an air bag, comprising an inflator housing, a gas generator accommodated in the inflator housing, and an ignition means chamber provided with ignition means connected to the gas generator, a pressurized medium containing an inert gas charged inside the inflator housing, wherein an outer shell of the gas generator is constituted by a gas generator housing, the gas generator housing includes a charge-transferring chamber formed inside a cylindrical charge-transferring chamber housing provided longitudinally in an extension of one ignition means, and a first gas generating chamber and a second gas generating chamber defined by the charge-transferring chamber housing and the gas generator housing and store gas generating means respectively;

the charge-transferring chamber housing has a plurality of flame-transferring holes provided at intervals in the longitudinal direction to make the charge-transferring chamber and the first gas generating chamber communicate with each other, and the first gas generating chamber and the second gas generating chamber are provided with a plurality of first communication holes and a plurality of second communication holes which communicate the interior of inflator housing respectively; and at least some of a plurality of the flame-transferring holes and the first communication holes are arranged not to face each other opposingly in the longitudinal direction.

Thus, if the flame-transferring holes and the first communication holes are arranged not to face each other opposingly in the longitudinal direction of the hybrid inflator, the gas generating means can be burnt uniformly in the same manner as above.

Moreover, in a hybrid inflator of the present invention, in order to burn the gas generating agent more uniformly as mentioned above, it is preferable that at least some of a plurality of the flame-transferring holes and the communication holes or a plurality of flame-transferring holes and the first communication holes are arranged not to face each other opposingly in the longitudinal direction of the hybrid inflator as well as in the widthwise direction.

Moreover, in a hybrid inflator of the present invention, in order to burn the gas generating agent more uniformly in the above manner, it is preferable that the plurality of flame-transferring holes and the plurality of communication holes or the first communication holes are provided evenly along the longitudinal direction of the gas generating chamber or the first gas generating chamber.

Moreover, in the hybrid inflator of the present invention, in order to burn the gas generating agent more uniformly as mentioned above, it is preferable that a plurality of the flame-transferring holes and the communication holes, or a plurality of the flame-transferring holes and the first communication holes are arranged at equal intervals.

Further, the hybrid inflator of the present invention may be structured such that respective distances in the longitudinal direction of the first gas generating chamber and the second gas generating chamber are adjusted by a first retainer disposed on one end of the gas generator housing and a second retainer disposed on the other end, that is between the first gas generating chamber and the second gas generating chamber.

In the present invention, it is preferable that the first and second retainers comprise a combination of a larger-diameter cylinder having one end surface closed and the other end face open, a smaller-diameter cylinder which is formed integrally with the larger-diameter cylinder to project towards the inside and the opening portion of the larger-diameter cylinder and has both end surfaces open, and an annular member provided between the larger-diameter cylinder and the smaller-diameter cylinder.

In the first and second retainers, the annular member provided between the larger-diameter cylinder and the smaller-diameter cylinder may be formed integrally with the closed end surface to project towards the opening portion or can be formed separately and arranged.

Further, in the first and second retainers, a height of the side wall of the larger-diameter cylinder is the highest and a height of the annular projecting member is the lowest.

In the present invention, preferably, the first retainer is arranged such that the closed end surface is positioned in the first gas generating chamber side and the second retainer is arranged such that the opening portion is positioned in the first gas generating chamber side.

When the first and second retainers are arranged in this manner, the first gas generating chamber lies between the closed end surface of the first retainer and the opening portion of the second retainer. With such an arrangement, a combustion gas generated in the gas generating chamber is prevented from entering the second gas generating chamber due to function of the second retainer. Furthermore, since the annular member exists on the opening portion of the second retainer, the gas generating means is prevented from entering the opening portion of the second retainer. If the annular member does not exist, combustion of the gas generating means which enters the opening portion of the second retainer may be delayed or movement of combustion gas may be blocked.

Also, the hybrid inflator of the present invention is structured such that a spare communication hole is provided in a wall surface of the gas generator housing where the gas generating chamber, or the first gas generating chamber and the second gas generating chamber do not exist, penetrating the wall surface.

Here, the "spare communication hole" does not function as a communication hole which is a passage of the pressurized medium and a combustion gas at normal activation, but functions as a communication hole, serving as a spare passage for discharging the pressurized medium and a combustion gas out of the inflator, only when there occurs the below-specified trouble at activation.

The gas generator housing provided with the communication holes or the first and second communication holes is not fixed by welding or the like, but it is mounted in a state such that one end thereof is fitted into a boss fixed to the inflator housing. Thereby, there may occur a trouble (the specified trouble) such that the gas generating housing moves in the longitudinal direction, due to the impact of activation, to block the passage for the pressurized medium and a combustion gas. In such a case, a normal activation of the hybrid inflator can be retrieved by the spare communication hole serving as another passage for the pressurized medium and a combustion gas.

Also in the hybrid inflator, a boss is disposed on one end of the hybrid inflator, the ignition means is disposed in an ignition means chamber formed inside the boss, the charge-transferring means adapted to be ignited and burnt by the ignition means is disposed inside the charge-transferring chamber housing, and one end of the charge-transferring chamber housing is fixed to the boss.

Furthermore, such a structure can be employed that one end of the charge-transferring chamber housing is provided with a skirt portion expanding in the radial direction, the charge-transferring means is inserted into the skirt portion, and the periphery of the skirt portion is crimped from the outside by an annular projecting portion integrated with the boss, or one end of the charge-transferring chamber housing has a bent portion bent outwardly in the radial direction, the charge-transferring means is inserted into one end formed with the bent portion in the charge-transferring chamber housing, and the periphery of the bent portion is crimped from the outside by the annular projecting portion integrated with the boss.

By employing such a structure, the charge-transferring means and the charge-transferring chamber housing are adhered and fixed to each other integrally, and thereby, a high-temperature booster gas (flame), generated by the charge-transferring means ignited and burnt due to activation of the ignition means, is prevented from leaking so that the gas generating means may be burnt smoothly.

Moreover, such a structure is preferably employed that the skirt portion and the annular projecting portion, or the bent portion and the annular projecting portion are brought into contact with each other to adhere closer by a force against a force applied in the longitudinal direction of the hybrid inflator.

During combustion of the charge-transfer means, a large force is applied to the charge-transferring chamber housing in the longitudinal direction of the hybrid inflator, and, by securing adhesion against that force, preferably by realizing surface-contact between the skirt portion and the annular projecting portion, or the bent portion and the annular projecting portion, leakage preventing action of a booster gas generated by actuation of the ignition means is further improved. If the skirt portion and the annular projecting portion, or the bent portion and the annular projecting portion are in spot-contact with each other, when a large force is applied in the longitudinal direction of the inflator, a clearance is generated between the skirt portion and the annular projecting portion, or the bent portion and the annular projecting portion, which may result in leakage of a booster gas.

Also, the present invention provides, as other means for solving the above problem, a hybrid inflator for an inflating-type safety system of a vehicle provided with an air bag, comprising an inflator housing, a gas generator accommodated in the inflator housing, and an ignition means chamber provided with ignition means connected to the gas generator, a pressurized medium containing an inert gas charged inside the inflator housing, wherein an outer shell of the gas generator is constituted by a gas generator housing, the gas generator housing includes a charge-transferring chamber formed inside a cylindrical charge-transferring chamber housing provided longitudinally in an extension of one ignition means, and a first gas generating chamber and a second gas generating chamber defined by the charge-transferring chamber housing and the gas generator housing and store gas generating means respectively;

respective distances in the longitudinal direction of the first gas generating chamber and the second gas generating chamber are adjusted by a first retainer disposed on one end and a second retainer disposed on the other end, that is between the first gas generating chamber and the second gas generating chamber; and the first and second retainers comprise a combination of a larger-diameter cylinder having one end surface closed and the other end surface open, a smaller-diameter cylinder formed integrally with the larger-diameter cylinder to project towards the inside and the opening portion of the larger-diameter cylinder and has both end faces open, and an annular member provided between the larger-diameter cylinder and the smaller-diameter cylinder.

In the first and second retainers, the annular member provided between the larger-diameter cylinder and the smaller-diameter cylinder can be formed integrally with a closed end surface to project towards an opening portion or can be formed separately and arranged.

Moreover, in these first and second retainers, a height of a side wall of the larger-diameter cylinder may be the highest and a height of the annular projecting member may be the lowest.

In the present invention, in order to obtain the above described operation, it is preferable that the first retainer is arranged such that a closed end surface thereof is positioned in the first gas generating chamber side and the second retainer is arranged such that an opening portion thereof is positioned in the first gas generating chamber side.

Also, the present invention provides a hybrid inflator for an inflating-type safety system of a vehicle provided with an airbag, comprising an inflator housing, a gas generator accommodated in the inflator housing, and an ignition means chamber provided with ignition means connected to the gas generator, a pressurized medium containing an inert gas charged in the inflator housing, wherein an outer shell of the gas generator is constituted by a gas generator housing, the gas generator housing includes a charge-transferring chamber formed inside a cylindrical charge-transferring chamber housing provided longitudinally in: an extension of one ignition means, and at least one gas generating chamber defined by the charge-transferring chamber housing and the gas generator housing and store a gas generating means; and a spare communication hole is provided in a wall surface of the gas generator housing where the gas generating chamber is not provided to penetrate the wall surface.

Here, the "spare communication hole" is as described as the above and has the same functions as the above.

Also, the present invention provides a hybrid inflator for an inflating-type safety system of a vehicle provided with an airbag, comprising an inflator housing, a gas generator accommodated in the inflator housing, and an ignition means chamber provided with ignition means connected to the gas generator, a pressurized medium containing an inert gas charged in the inflator housing, wherein an outer shell of the gas generator is constituted by a gas generator housing, the gas generator housing includes a charge-transferring chamber formed inside a cylindrical charge-transferring chamber housing provided longitudinally in an extension of one ignition means, and at least one gas generating chamber defined by the charge-transferring chamber housing and the gas generator housing and store a gas generating means;

a boss is disposed in one end of the hybrid inflator, the ignition means is disposed in the ignition means chamber formed inside the boss, and charge-transferring means adapted to be ignited and burnt by the ignition means is disposed in the charge-transferring chamber housing; and one end of the charge-transferring chamber housing has a skirt portion expanding in the radial direction, the charge-transferring means is inserted into the skirt portion, and the periphery of the skirt portion is crimped from the outside by an annular projecting portion integrated with the boss, or one end of the charge-transferring chamber housing has a bent portion bent outwardly in the radial direction, the charge-transferring means is inserted into one end formed with the bent portion in the charge-transferring chamber housing, and the periphery of the bent portion is crimped from the outside by the annular projecting portion integrated with the boss.

By employing such a structure, the charge-transferring means and the charge-transferring chamber housing are adhered and fixed to each other integrally as described above, a high temperature booster gas (flame) generated by the charge-transferring means ignited and burnt due to activation of the ignition means is prevented from leaking so that the gas generating means may be burnt smoothly.

In the hybrid inflator of the present invention, as described below, the gas generating agent (gas generating means) accommodated in the gas generating chamber, or first and second gas generating agents (gas generating means) accommodated in the first and second gas generating chambers, respectively, may be determined in relation with composition of the pressurized medium charged in the inflator housing. In this invention, the gas generating agent used in a single type inflator and the gas generating agent used in a dual type inflator are the same, so that the gas generating agent used in the dual type inflator will be described below.

The pressurized medium used in the hybrid inflator of the present invention consisting essentially of an inert gas such as argon, helium (nitrogen is also included in the inert gas in the present invention), etc., and it may contain oxygen as required. Argon works to promote the thermal expansion of the pressurized medium. It is preferable to contain helium in the pressurized medium since the leakage of the pressurized medium can be detected easily for the purpose of preventing distribution of the imperfect products. Also, oxygen works to convert carbon monoxide or hydrogen generated due to the combustion of the gas generating agent serving as the gas generating means into carbon dioxide or water steam. A charging pressure (=pressure in the inflator housing) of the pressurized medium is preferably 10,000 to 70,000 kpa, and more preferably 30,000 to 60,000 kPa. Incidentally, the pressurized medium may contain oxygen or it may not contain oxygen. When the pressurized medium contains oxygen, the content of oxygen is preferably at most 30 mol %.

As the first and second gas generating agents stored respectively in the first and second gas generating chambers, a gun propellant may be used for example. As the gun propellant, a single-base gun propellant, a double-base gun propellant, and a triple-base gun propellant may be used. In addition to those gun propellants, it is possible to use a gun propellant obtained by mixing a secondary explosive, a bonding agent, a plasticizer and a stabilizer and the like, and molding the resultant mixture to a desired shape.

The secondary explosive may include hexahydrotrinitrotriazine (RDX), cyclotetramethylene tetranitramine (HMX), pentaerithritol tetranitrate (PETN), and triaminoguanidine nitrate (TAGN). For example, when a gas generating agent using RDX as a secondary explosive is burned in an oxygen-absent atmosphere under a pressure of 20,670 kPa and at a combustion temperature of 3348 K, a formed gas in a combustion gas comprises 33 mol % of nitrogen, 25 mol % of carbon monoxide, 23 mol % of vapor, 8 mol % of carbon dioxide and other gas components.

The bonding agent may include cellulose acetate, cellulose acetate butylate, cellulose acetate propiolate, ethyl cellulose, polyvinyl acetate, azide polymer, polybutadiene, polybutadiene hydride, and polyurethane; the plasticizer may include trimethylolethane trinitrate, butantriol trinitrate, nitroglycerine, bis (2,2-dintropropyl) acetal/formal, glycidyl azide, acetyltriethl citrate, and the like; and the stabilizer may include ethlcentralite, diphenylamine, and loesosinol.

A preferable ratio of the secondary explosive to the bonding agent, plasticizer and stabilizer is about 50 to 90 wt. % of secondary explosive to about 10 to 50 wt. % of bonding agent, plasticizer and stabilizer in all.

In some cases, the gas generating agent of the above-described composition is not smoothly burnt under normal pressure. However, when the interior thereof is maintained at a high pressure in advance like the hybrid inflator of the present invention, the gas generating agents may be burnt stably and smoothly.

In addition, the first gas generating agent accommodated in the first gas generating chamber and the second gas generating agent accommodated in the second gas generating chamber may be obtained, for example, in such manner that one including fuel and oxidizing agent, or one including fuel, oxidizing agent, and slag-forming agent is mixed with bonding agent, if required, to be molded into a desired shape. If such a gas generating agent is used, a gas generated due to combustion of such an agent may be used for developing the air bag together with the pressurized medium. Especially, when the gas generating agent including the slag-forming agent is used, an amount of mist discharged from the inflator may be largely reduced.

Preferably, the fuel may be one or more materials selected from a group consisting of guanidine derivatives such as nitroguanidine (NQ), guanidine nitrite (GN), guanidine carbonate, amino nitroguanicine, amino guanidine nitrite, amino guanidine carbonate, diamino guanidine nitrite, diamino guanidine carbonate, and triamino guanidine nitrite but, not limited thereto. Further, as the fuel, at least one selected from tetrazole, tetrazole derivatives and the like may be also used.

As oxidizer, one or more materials selected from a group comprising strontium nitrate, potassium nitrate, ammonium nitrate, potassium perchlorate, copper oxide, ferrous oxide, basic copper nitrate may be used. Preferable composition amount of oxidizer is 10 to 80 parts by weight, and more preferably, 20 to 50 parts by weight with respect to 100 parts by weight of fuel.

Preferably, the slag-forming agent may be one or more materials selected from a group consisting of acid clay, talc, bentonite, diatomaceous earth, kaolin, silica, alumina, sodium silicate, silicon nitride, silicon carbide, hydrotalsite, and a mixture thereof. Preferable composition amount of slag-forming agent is 0 to 50 parts by weight, and more preferably, 1 to 10 parts by weight with respect to 100 parts by weight of fuel.

Preferably, the bonding agent may be one or more materials selected from a group consisting of sodium salt of sodium carboxymethylcellulose, hydroxyethyl cellulose, starch, polyvinyl alcohol, guar gum, microcrystal cellulose, polyacrylamide, and calcium stearate.

Preferable composition amount of the bonding agent is 0 to 30 parts by weight, and more preferably, 3 to 10 parts by weight with respect to 100 parts by weight of fuel. Preferably, the fuel may be one or more selected from guanidine derivative such as nitroguanidine (NQ), guanidine nitite (GN), guanidine carbonate, amino nitroguanidine, amino guanidine nitrite, amino guanidine carbonate, diaminoguanidine nitrite, diamino guanidine carbonate, and triamino guanidine nitrite. As fuel one or two or more materials selected from a group comprising tetrazole and tetrazole derivative may be used.

The present invention provides an air bag system comprising activation signal-outputting means including an impact sensor and a control unit, and a module case in which the above-described hybrid inflator and an air bag are accommodated.

Since one of the characteristics of the dual type hybrid inflator of the present invention is in the arrangement of the flame-transferring holes and the first communication holes, the structure and arrangement of the first and second retainers, the existence of the spare communication hole, the mounting method of the charge-transferring chamber housing and so on, malfunctioning of the hybrid inflator at activation is avoided owing to these functions. Even in a single type hybrid inflator, the same functions may be obtained. Accordingly, when the present invention is applied to an air bag system, an air bag may be inflated rapidly and unfailingly.

DETAILED DESCRIPTION OF EMBODIMENTS
OF THE INVENTION

Figure 1:
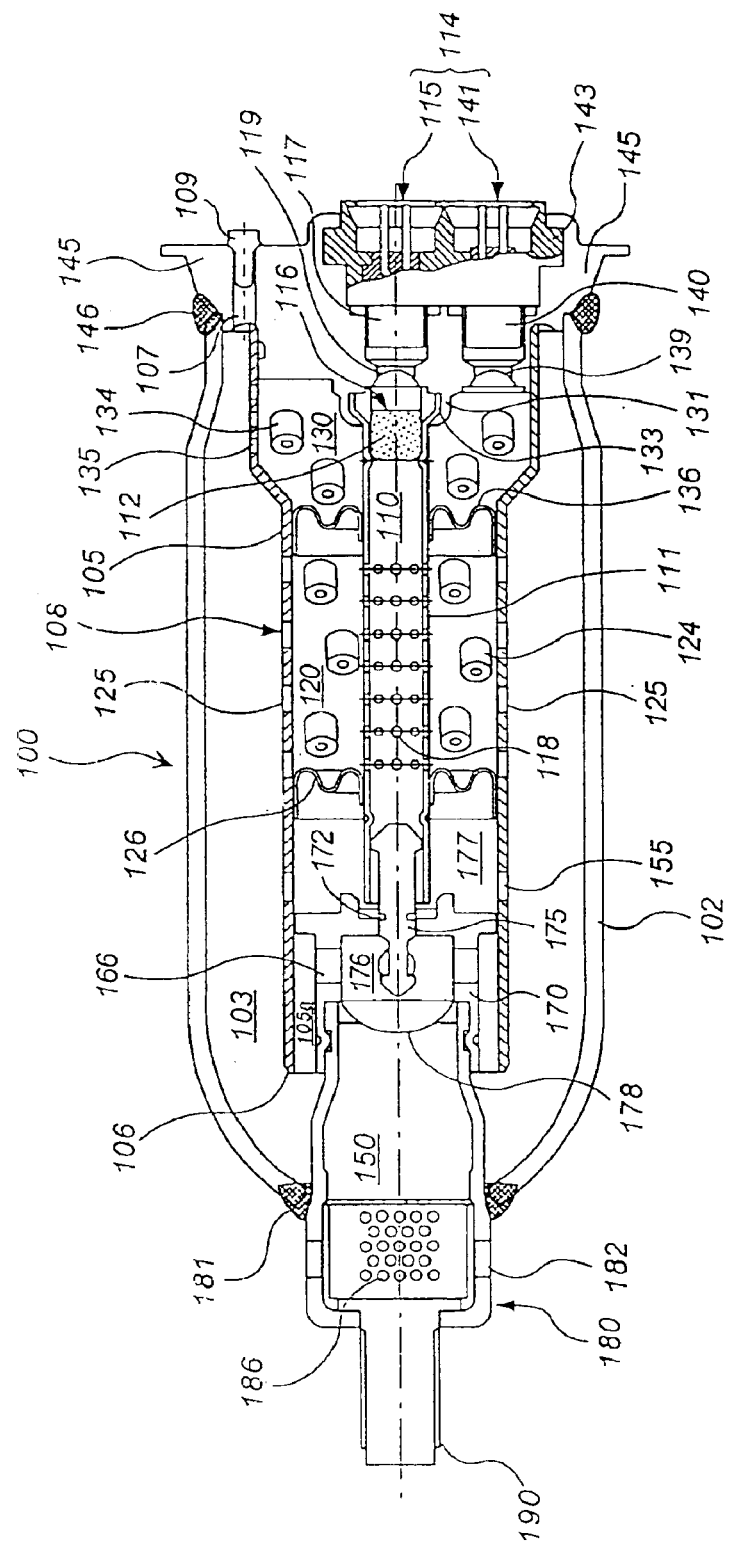
FIG. 1 is a longitudinal sectional view showing one embodiment of a dual type hybrid inflator of the present invention.
Figure 2:
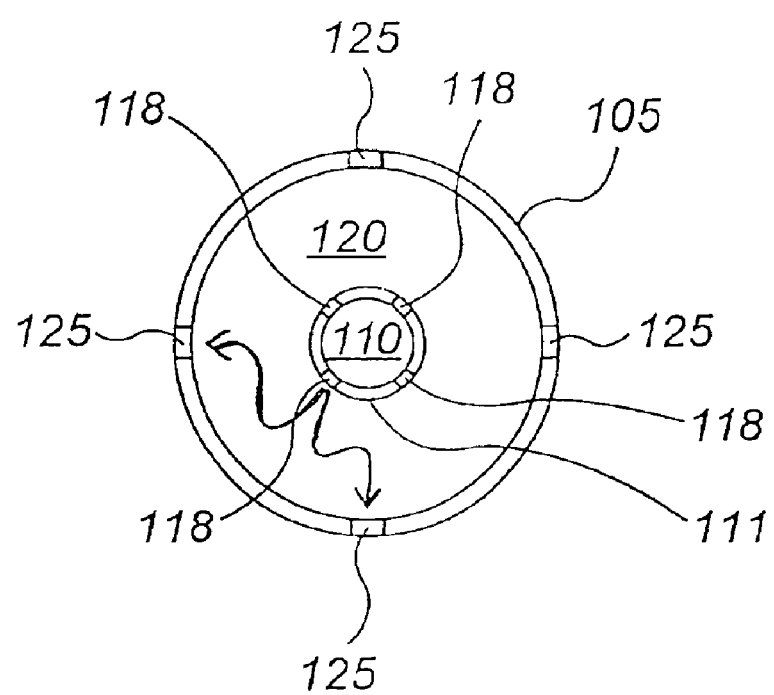
FIG. 2 is a widthwise sectional view of a first gas generating chamber of the hybrid inflator shown in FIG. 1.
Figure 3:
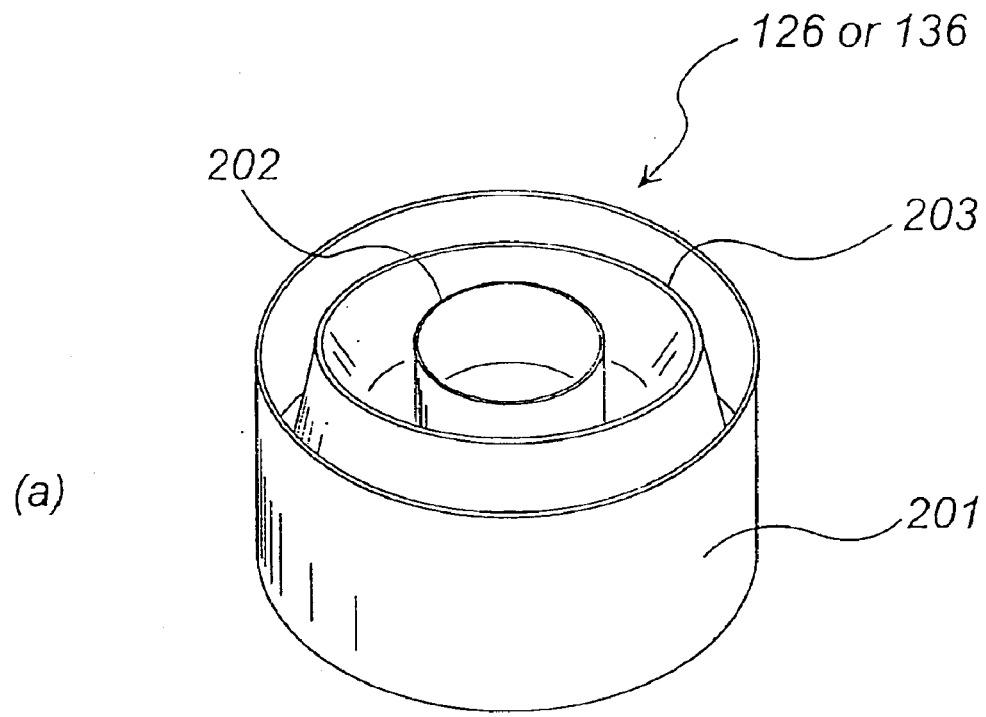
FIG. 3(a) is a perspective view of a retainer used in the inflator shown in FIG. 1.
FIG. 3(b) is a sectional view of the retainer used in the inflator shown in FIG. 1.
Figure 3:
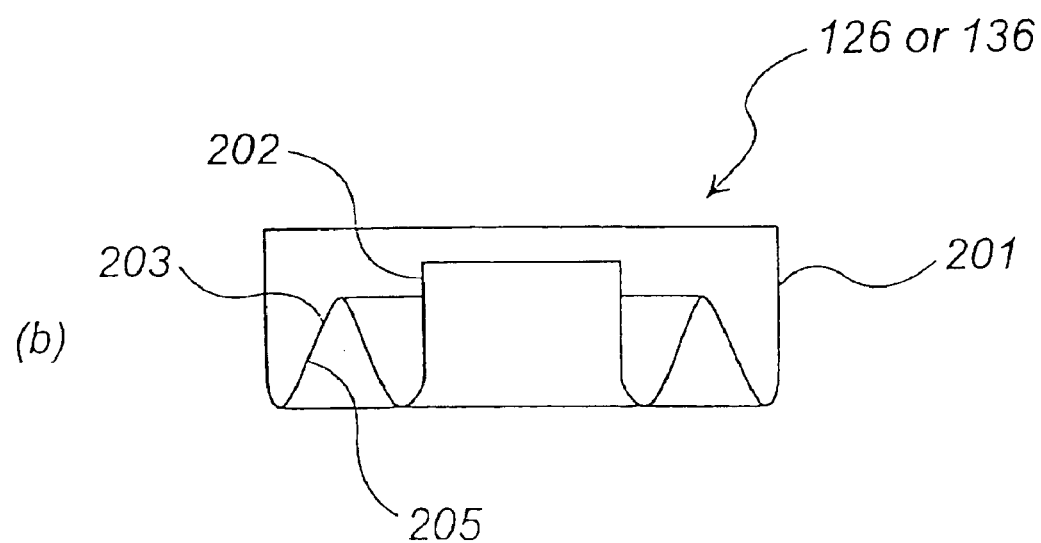

The present invention will be explained in detail as follows with reference to the drawings showing embodiments of the invention. FIG. 1 is a longitudinal sectional view of one embodiment of a dual type hybrid inflator 100, FIG. 2 is a widthwise sectional view of a first gas generating chamber shown in FIG. 1, FIG. 3(a) is a perspective view of a retainer used in the embodiment shown in FIG. 1, and FIG. 3(b) is a sectional view of the retainer shown in FIG. 1.

As shown in FIG. 1, an inflator housing 102 comprises a cylindrical pressure-resisting container, and its inner space 103 is filled with a pressurized medium and maintained at a high pressure. The pressurized medium is usually charged from a small hole 107 formed in a boss 145 connected to one end of the inflator housing 102, and the small hole 107 is closed with a seal pin 109 after the pressurized medium has been charged. The inflator housing 102 may be formed to have a shape such that the outer shape thereof except for a portion in the vicinity of the end portion in the diffuser 108 side has a uniform diameter (even shape without constriction or the like).

An outer shell of a gas generator 108 is formed by a gas generator housing 105, one end of which is fitted into a boss 145. The gas generator 108 includes, therein, a charge-transferring chamber 110, and a first gas generating chamber 120 and a second gas generating chamber 130 surrounding the charge-transferring chamber 110 and disposed adjacent to each other in series in the longitudinal direction of the inflator housing 102.

The charge-transferring chamber 110 comprises a cylindrical charge-transferring chamber housing 111, and is connected to a first igniting initiator 117 through a booster cup 116, in which a booster agent (transfer charge) 112 serving as charge-transferring means is charged and a first communication passage closed by a first rupturable plate 119 serving as first closing means. The charge-transferring chamber 110 is in communication with the first gas generating chamber 120 through flame-transferring holes 118.

The first gas generating chamber 120 surrounds the charge-transferring chamber 110, and is defined by the gas generator housing 105, the charge-transferring chamber housing 111, a first retainer 126, and a second retainer 136. A required amount of a first gas generating agent 124, serving as gas generating means, is accommodated in the first gas generating chamber 120. The first gas generating chamber 120 and the inflator housing 102 communicate each other through a plurality of first communication holes 125. A diameter of a plurality of first communication holes 125 is adjusted such that the first gas generating agent 124 does not pass through the holes 125 into the first gas generating chamber 120.

As shown in FIG. 1, a plurality of the flame-transferring holes 118 and a plurality of the first communication holes 125 are arranged in part not to face each other opposingly in the longitudinal direction of the inflator housing 102. If the flame-transferring holes 118 and the first communication holes 125 are arranged in this manner, the first gas generating agent 124 may be burnt uniformly for the following reason.

If the flame-transferring holes 118 and the first communication holes 125 are arranged in part not to face each other opposingly, a flow of a high temperature-booster gas, generated due to combustion of the booster agent 118 to flow out of the charge-transferring holes, passes the longer distance to flow out of the first communication holes 125 after contacting with the first gas generating agent 124, compared with a case such that the flame-transferring holes 118 and the first communication holes 125 are arranged to face each other opposingly. For this reason, all the first gas generating agent may be burnt uniformly. Furthermore, in FIG. 1, since some of the flame-transferring holes 118 and the first communication holes 125 are arranged to face each other opposingly, the gas flow is never blocked because of the other holes which do not face each other opposingly.

Meanwhile, if all flame-transferring holes 118 face opposingly the first communication holes 125, a booster gas which flows out of the flame-transferring holes 118 passes the shortest distance from the flame-transferring hole 118 and the first communication hole 125 so that the first gas generating agent 124, positioned on an imaginary line connecting the flame-transferring hole 118 and the first communication hole 125 may be burnt but the first gas generating agent 124 which is not positioned on said imaginary line may be burnt at a delayed timing.

Moreover, as shown in FIG. 2, it is preferable that the plurality of the flame-transferring holes 118 and the plurality of the communication holes 125 are arranged not to face each other opposingly in the widthwise direction (radial direction). With such an arrangement, the booster gas flows, as shown in arrows, so that the first gas generating agent 124 may uniformly be burnt.

Also, in order to burn the first gas generating agent 124 uniformly, it is preferable that the plurality of flame-transferring holes 118 and the plurality of communication holes 125 are provided evenly along the longitudinal direction of the first gas generating chamber 120.

Further, it is preferable that the plurality of flame-transferring holes 118 and the plurality of first communication holes 125 are arranged at equal intervals, respectively.

A second gas generating chamber 130 is defined by the gas generator housing 105, the charge-transferring chamber housing 111, the second retainer 136, and the boss 145 (and a second rupturable plate 139). The second gas generating chamber 130 includes, therein, a required amount of second generating agent 134 serving as second gas generating means. The second gas generating chamber 130 and the inflator housing 102 communicate with each other through a plurality of communication holes 135 having diameters adjusted in the above-described manner.

The volumes of the first gas generating chamber 120 and the second gas generating chamber 130 are determined by the first retainer 126 and the second retainer 136. As the second retainer 136, one having the structure shown in FIGS. 3(a) and 3(b) is preferably employed. Also, in view of reducing manufacturing steps, the first retainer 126 and the second retainer 136 may be the same.

Each of the first retainer 126 and the second retainer 136 comprises a larger-diameter cylinder 201 having one end closed and the other end open, a smaller-diameter cylinder 202 having both ends open and formed integrally with the larger-diameter cylinder 201 to project towards the inside and the open end of the larger-diameter cylinder 201, and an annular member 203 provided between the larger-diameter cylinder 201 and the smaller-diameter cylinder 202 and integrated with the closed end to be projected.

The annular member 203 is for preventing the first gas generating agent 124 from entering the opening portion of the second retainer 136. Therefore, as long as the annular member 203 has such a function, it is not particularly limited this structure and an annular member formed separately may be fitted.

As shown in FIG. 1, the first retainer 126 and the second retainer 136 are engaged by inserting the charge-transferring chamber housing 111 into a through-hole portion of the smaller-diameter cylinder 202, so that an outer wall surface of the larger-diameter cylinder 201 make contact with an inner wall surface of the gas generator housing 105, and that an outer wall surface of the smaller-diameter cylinder 202 makes contact with an outer wall surface of the charge-transferring chamber housing 111.

The first retainer 126 and the second retainer 136 are mounted in a state such that they are fitted to the charge-transferring chamber housing 111. In order to secure stability at a time of mounting, it is preferable that the height of the side wall of the larger-diameter cylinder 201 is higher than that of the smaller-diameter cylinder 201. The annular member 203 has such a height that the gas generating agent 124 cannot enter the inside.

The first retainer 126 is arranged such that the closed end surface is positioned in the first gas generating chamber 120 side, and the second retainer 136 is arranged such that the opening portion is positioned on the first gas generating chamber 120 side.

With such an arrangement, when the first gas generating agent 124 is burnt and a pressure inside the first gas generating chamber 120 increases, the second retainer 136 is inflated to be spread outwardly so that the outer wall surface of the larger-diameter cylinder 201 presses the inner wall surface of the gas generator housing 105 to obtain closer contact therebetween, and also the outer wall surface of the smaller-diameter cylinder 202 presses the outer wall surface of the charge-transferring chamber housing 111 to obtain closer contact therebetween. As a result, the combustion gas in the first gas generating chamber 120 is prevented from leaking into the second gas generating chamber 130. Moreover, the other surface 205 of the annular member of the first retainer 126 is also pressed and at the same time, the larger-diameter cylinder 201 and the smaller-diameter cylinder 202 are spread apart, and thereby, the combustion gas is prevented from leaking into the space 177.

The second gas generating chamber 130 is connected to a second igniting initiator 140 through a second communication passage closed by a second rupturable plate 139 serving as second closing means. Incidentally, in the second gas generating chamber 130, a plurality of second communication holes 135 are formed in the opposite side of the second igniting initiator 140 in the widthwise direction (a radial direction).

Since the first igniting initiator 117 (the first ignition means chamber 115) and the charge-transferring chamber 110 are arranged on the center axis (shown in the dotted line in FIG. 1) extending in the longitudinal direction of the inflator housing 102, the second igniting initiator 140 is arranged eccentrically with respect to the center axis.

An amount of the second gas generating agent 134 may be equal to or more than or less than an amount of the first gas generating agent 124. Also, a shape and composition of the second gas generating agent 134 may be the same as or different from the first gas generating agent 124.

As mentioned above, the charge-transferring chamber 110 communicates with the first gas generating chamber 120, the first gas generating chamber 120 communicates with the inflator housing 102, and further, the second gas generating chamber 130 communicates with the inflator housing 102, and thereby, the charge-transferring chamber 110, the first gas generating chamber 120, and the second gas generating chamber 130 are all maintained in a high pressure, namely they are maintained in the same pressure as that of the interior (inner space 103) of the inflator housing 102.

The first gas generating chamber 120 and the second gas generating chamber 130 are arranged in series and adjacent to each other along the longitudinal direction of the inflator housing 102. By arranging them in series, even when two gas generating chambers are provided, the entire size of the hybrid inflator can be made compact and increase in weight thereof can be suppressed.

In the first gas generating chamber 120 and the second gas generating chamber 130, passages, through which gases respectively generated by combustion of the first gas generating agent 124 and the second gas generating agent 134 flow into the inflator housing 102, are independent from each other. That is, a combustion gas generated in the first gas generating chamber 120 flows from the first communication holes 125 into the inflator housing 102, and the combustion gas generated in the second gas generating chamber 130 flows from the second communication holes 135 into the inflator housing 102.

Also, in the first gas generating chamber 120 and the second gas generating chamber 130, when a gas generated in the first gas generating chamber 120 flows as a gas flow from the first communication holes 125 of the inflow path to a diffuser port 182 inside the inflator housing 102, the second communication hole 135 of an inflow path of the second gas generating chamber 130 is positioned in a direction opposite to the first communication hole 125, which is the inflow path of the first gas generating chamber 120, in view of the gas flow.

By arranging the first gas generating chamber 120 and the second gas generating chamber 130 in this manner, the combustion in the first gas generating chamber 120 does not affect the second gas generating chamber 130. Such an arrangement is effective especially in such a case that oxygen is not contained in the pressurized medium because combustion in the first gas generating chamber 120 does not affect the second gas generating chamber 130. Incidentally, the arrangement order of the first gas generating chamber 120 and the second gas generating chamber 130 may be reversed.

An ignition means chamber 114 formed in the boss 145 includes a first ignition means chamber 115 and a second ignition means chamber 141. The first ignition means chamber accommodates the first igniting initiator 117 therein and the second ignition means chamber 141 accommodates the second igniting initiator 140. The first and second ignition means chambers may be arranged in parallel and adjacent to each other in the widthwise direction of the inflator housing 102.

The first igniting initiator 117 and the second igniting initiator 140 are mounted to the boss 145 through an initiator collar 143, and the boss 145 is fixed to the inflator housing 102 at a joining portion 146 by welding or the like.

Figure 4:
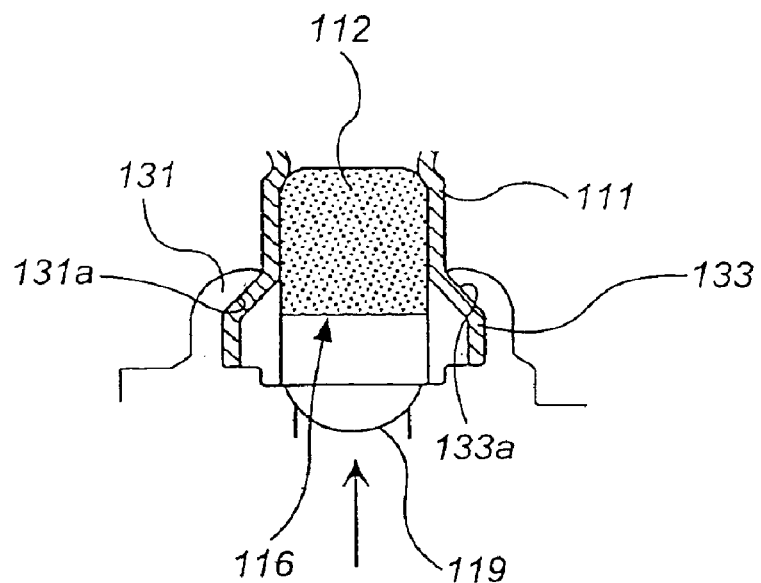
FIG. 4 is a partially sectional view of the hybrid inflator shown in FIG. 1.

As shown in FIG. 1 and FIG. 4, a partially enlarged view of FIG. 1, one end of the charge-transferring chamber housing 111 has a skirt portion 133 expanded in the radial direction, and a buster cup 116 is inserted into the skirt portion 133. Then, by a annular projecting portion 131 of the skirt portion 133 integrated with the boss 145, a periphery of the skirt portion 133 is crimped from the outside, and by a surface-contact between an inner surface 131a of the annular projecting portion 131 and an outer surface of the skirt portion 133, these surfaces make contact with each other closely.

When a large force is applied to the charge-transferring chamber housing 111 in the direction of the arrow (in the longitudinal direction) at an activation of the hybrid inflator 100, the skirt portion 133 is also moved in the direction of the arrow (see FIG. 4), and the outer surface 133a thereof is pressed against the inner surface 131a of the annular projecting portion, namely, a force against a force in the direction of the arrow (the longitudinal direction) is applied to the outer surface 133a of the skirt portion by the inner surface 131a of the annular projecting portion, and thereby, a contact between the contacting surfaces is further enhanced. Therefore, the booster gas generated in the charge-transferring chamber 110 is prevented from leaking into the first igniting initiator 117 side.

Figure 5:
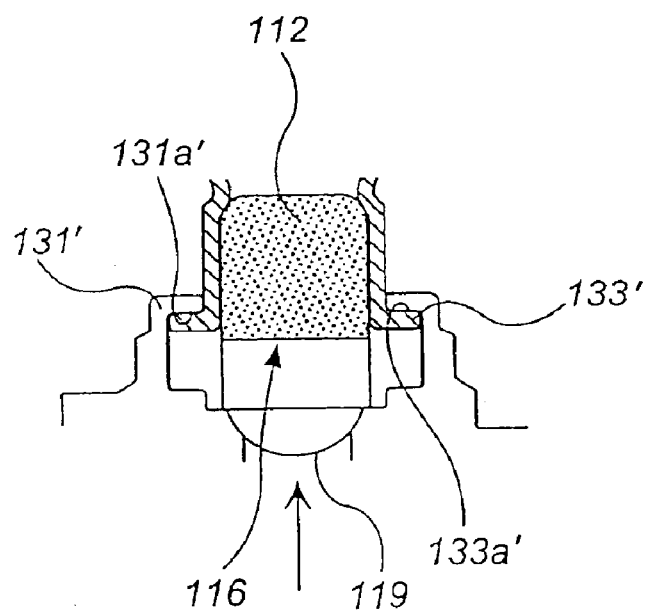
FIG. 5 is a sectional view of another embodiment from that shown in FIG. 4.

Next, a structure for preventing a booster gas from leaking according to a different embodiment from that shown in FIG. 4 will be explained with reference to FIG. 5. As shown in FIG. 5, one end of a charge-transferring chamber housing 111 is bent outwardly in the radial direction to form a bent portion 133', and a booster cup 116 is inserted into the bent portion 133'. Then, the periphery of the bent portion 133' is crimped from the outside by an annular projecting portion 131' integrated with the boss 145, and an inner surface 131a' of the annular projecting portion 131' and an outer surface 133a' of the bent portion 133' are brought in surface-contact with each other, thereby achieving a closer contact between contacting areas. Even in the embodiment shown in FIG. 5, a booster gas generated in the charge-transferring chamber 110 may be prevented from leaking into the first igniting initiator 117 side according to the same action as FIG. 4.

An adapter 170 is connected in extension of the charge-transferring chamber 110, and a projectile 175 having the illustrated shape for rupturing a main rupturable plate 178 upon actuation is mounted through an O-ring 172 to an opening portion where the charge-transferring chamber 110 and the adapter 170 communicate each other, straddling the charge-transferring chamber 110 and the adapter 170. A top end of the projectile 175 is positioned in an inner space 176 of the adapter 170. The inner space 176 and inner space 103 of the inflator housing 102 communicate with each other exclusively through a plurality of gas inflow holes 166 provided on a surface of the adapter 170 opposing an inner surface of the housing 105. Since a gas flow path 105a is defined by the inner surface of the housing 105 and the outer surface of the adapter 170, the pressurized medium in the inner space 103 necessarily flows in the gas inflow holes 166 through the gas flow path 105a at the time of activation.

A spare communication hole 155 which communicates with the inner space 103 is provided in a wall surface of the gas generator housing 105 where the first gas generating chamber 120 and the second gas generating chamber 130 do not exist. The spare communication hole 155 serves as a spare path for discharging the pressurized medium and a combustion gas out of the hybrid inflator 100.

The diffuser 180 is connected to one end of the inflator housing 102. The diffuser 180 is fixed at a connecting portion 181 by welding. The main rupturable plate 178 of the main closing means for blocking a flow path to a diffuser port 182 of the pressurized medium before actuation is disposed on one end of the diffuser 180, opposing the projectile 175. Therefore, before actuation, a gas inflow space 150 and the inner space 103 of the inflator housing 102 are completely separated and isolated from each other by the main rupturable plate 178 and a flow of the pressurized medium is, therefore, blocked.

On the other end of the diffuser 180, a plurality of diffuser ports 182 for introducing the pressurized medium to the air bag and a diffuser screen 186 for removing fine particles are provided. A stud bolt 190 for connecting the inflator to the air bag module is fixed to the outer surface of the diffuser 180.

In the hybrid inflator 100, it is preferable that the above-described constituent elements are arranged symmetrically in the widthwise direction with respect to the center axis (shown as the dotted line in FIG. 1), but some or all of the constituent elements may be arranged eccentrically with respect to the center axis.

In the hybrid inflator of the present invention, the arrangement of the first and second gas generating chambers may be changed appropriately as described below.

For example, the first gas generating chamber 120 and the second gas generating chamber 130 may be arranged on both ends of the inflator housing 102, respectively, to face each other inside the housing. In this case, the pressurized medium is charged into the space between the first gas generating chamber 120 and the second gas generating chamber 130.

Further, for example, in the inflator housing 102, the first gas generating chamber 120 (or the second gas generating chamber 130) may surround the charge-transferring chamber 110, and the second gas generating chamber 130 (or the first gas generating chamber 120) may surround the first gas generating chamber 120.

Figure 6:
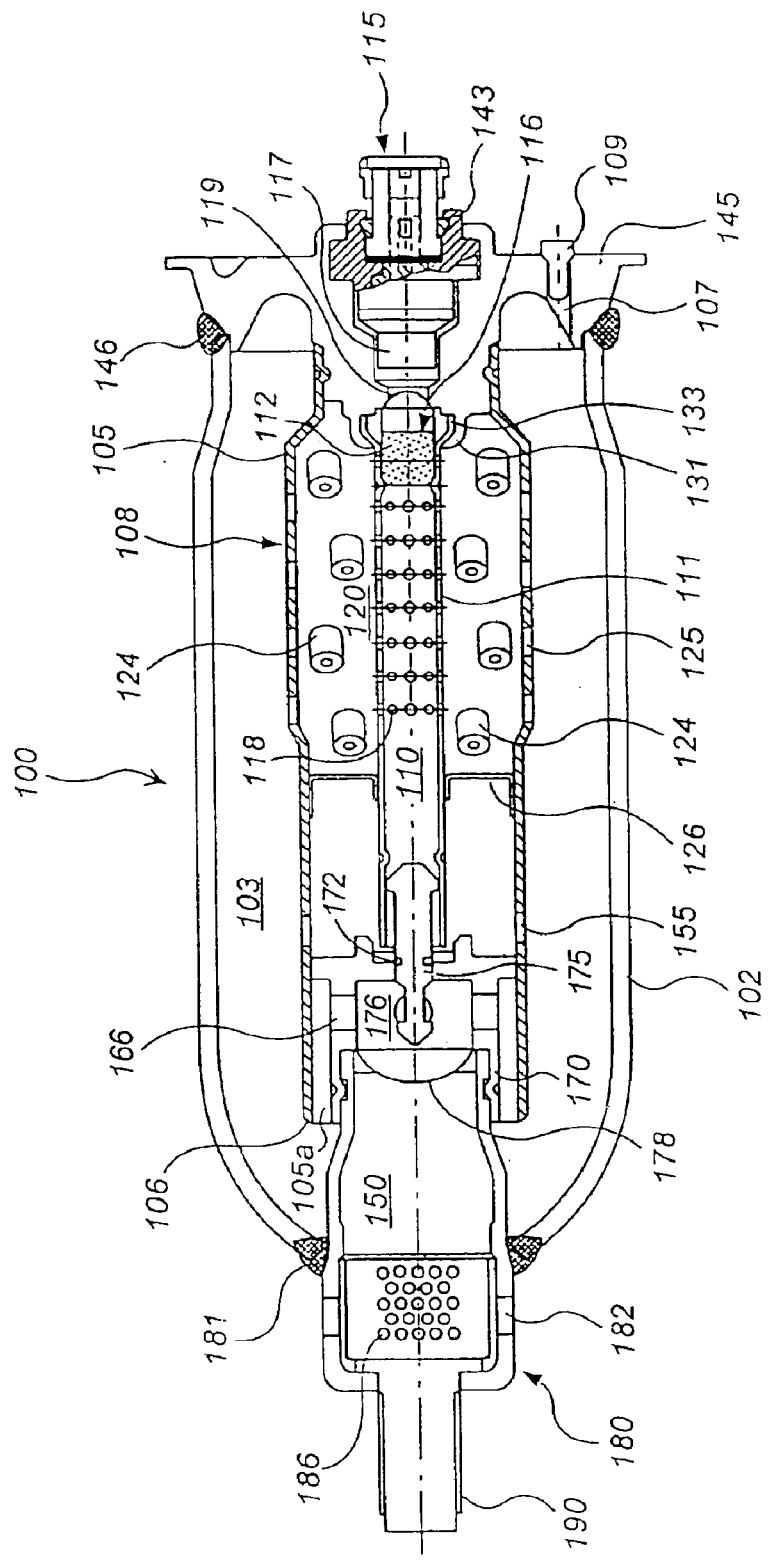
FIG. 6 is a longitudinal sectional view showing one embodiment of a single type hybrid inflator of the present invention.

Next, a single type hybrid inflator 100 will be explained with reference to FIG. 6. The single type hybrid inflator has the same structure and operation as those in the dual type hybrid inflator 100 shown in FIG. 1 except that the single type hybrid inflator includes only one gas generating chamber (corresponding to the first gas generating chamber in FIG. 1) and only one ignition means corresponding thereto. In FIG. 6, the same reference numerals as those shown in FIG. 1 have the same meanings, but, as the retainer 126, a retainer in a different shape from that in FIG. 1 is used.

The air bag system of the present invention is provided with activation signal-outputting means including an impact sensor and a control unit, and a module case in which the hybrid inflator 100 and the air bag are accommodated. The hybrid inflator 100 is connected to the activation single-outputting means (the impact sensor and the control unit) at the first igniting initiator 117 and the second igniting initiator 140, and it is connected and fixed inside the module case attached with the air bag by screwing the stud bolt 190. In the air bag system thus structured, an amount of gas generation is adjusted according to the degree of impact by properly setting the activation signal-outputting conditions in the activation signal-outputting means, so that an inflating speed of the air bag may be adjusted.

Next, an operation of the hybrid inflator 100 will be explained with reference to FIGS. 1 to 4.

Before the hybrid inflator 100 is activated, the pressurized medium charged in the inflator housing 102 under a high pressure is also contained in the first gas generating chamber 120 and the second gas generating chamber 130 which are in communication with the interior of the inflator housing 102 through the first communication holes 125 and the second communication holes 135 respectively. Further, the pressurized medium is also contained in the charge-transferring chamber 110 through the flame-transferring holes 118, being maintained at the same high pressure. Also, since the projectile 175 is mounted to straddle the inner space 176 and the charge-transferring chamber 110 maintained at the same pressure, malfunction of the hybrid inflator 100 is avoided.

When a vehicle collides, the first igniting initiator 117 is ignited by the activation signal-outputting means to rupture the first rupturable plate 119, and then ignites and burns the booster 112, thereby generating a high-temperature booster gas.

When the internal pressure in the charge-transferring chamber 110 increases by generation of the booster gas, the projectile 175 pushed by the pressure is moved such that the main rupturable plate 178 is ruptured by a sharp top end of the projectile. At this time, a portion of the booster gas flows into the gas inflow space 150 due to rupturing of the main rupturable plate 178. Incidentally, since the skirt portion 133 and the annular projecting portion 131 are brought in surface-contact with each other to resist the pressure at activation, the booster gas is prevented from leaking into the first igniting initiator 117 side.

Most part of the booster gas flows into the first gas generating chamber 120 from the flame-transferring holes 118 to ignite and burn the first gas generating agent 124, and a required amount (corresponding to the amount of the first gas generating agent 124) of high-temperature combustion gas is generated. At this time, the flame-transferring holes 118 and the first communication holes 125 are arranged in part not to face each other in the longitudinal direction of the hybrid inflator and also are all arranged not to face each other in the widthwise direction thereof, so that the first gas generating agent 124 may be burnt uniformly. Also, since the pressurized medium flows into the first gas generating chamber 120 to maintain the interior thereof at a high pressure, the combustion of the first gas generating agent 124 is stable. Incidentally, at the time of combustion of the first gas generating agent, the second gas generating agent 134 is never ignited and burnt due to function of the first retainer 126. Further, the arrangement of the first communication holes 125 of the first gas generating chamber 120 and the second communication holes 135 of the second gas generating chamber 130 also serves to prevent the second gas generating agent 134 from being ignited and burnt due to the combustion of the first gas generating agent 124.

Thereafter, the combustion gas generated in the first gas generating chamber 120 flows into the inner space 103 through the first communication holes 125, and the pressurized medium pressed by this combustion gas flows into the gas inflow space 150 through the ruptured main rupturable plate 178. The pressurized medium flowing into the gas inflow space 150 in this manner is further ejected from the diffuser port 182 through the diffuser screen 186 to inflate the air bag mounted to the air bag module.

Further, the second igniting initiator 140 is ignited by the activation signal-outputting means simultaneously when or slightly after (about 10 to 40 ms) the first igniting initiator 134 is activated, and the second rupturable plate 139 is ruptured, and the second gas generating agent 134 is ignited and burnt, thereby generating the required amount (an amount corresponding to the charged amount of the second gas generating agent 134) of a high-temperature combustion gas. At this time, since the second gas generating chamber 130 has been charged with the pressurized medium and maintained in a high pressure, the combustion of the second gas generating agent 134 is stable.

Also, as shown in FIG. 1, since the second igniting initiator 140 is separated from the second communication holes 135 and oriented in a different direction therefrom in the radial direction, the second gas generating agent 134 in the second gas generating chamber 130 is burnt uniformly. For example, if the second communication holes 135 are arranged in the vicinity of the second igniting initiator 140, the second gas generating agent 134 close to the second communication holes 135 is burnt smoothly, but the second gas generating agent 134 positioned far from the second communication holes 134 may be hardly burnt in some cases.

The high-temperature combustion gas generated by combustion of the second gas generating agent 134 flows in the inner space 103 through the second communication holes 135 to increase the pressure, and the pushed remaining pressurized medium flows into the gas inflow space 150 through the ruptured main rupturable plate 178 and is ejected from the diffuser port 182 to further inflate the air bag.

Incidentally, since the gas generator housing 105 is fitted into the boss 145 to be mounted, there is a possibility such that it is moved in the longitudinal direction opposite to the boss 145 by increase of pressure due to the combustion of the first gas generating agent 124 and the second gas generating agent 134 so that the tip end 106 of the gas generator housing 105 may collide the inflator housing 102. If the gas generator housing 105 collides, a passage from the inner space 103 to the gas flow passage 105a and the gas inflow hole 166 is blocked so that a flow passage of the pressurized medium and a combustion gas towards the outside is blocked. However, with the spare communication hole 155, even in case of the above collision of the gas generator housing 105, the passage to the gas flow passage 105a and the gas inflow hole 166 is secured because the spare communication holes 155 are positioned to face oppositely the gas inflow holes 166 in the longitudinal direction and/or in the widthwise direction.

In the above-described hybrid inflator, by generating the combustion gas in two stages, an inflating action of an air bag at the time of a vehicle collision may be prevented from being delayed by the function of the first gas generating chamber 120, and the pressurized medium in the inflator housing 102 may be discharged completely by the function of the second gas generating chamber 130, thereby inflating the air bag immediately up to a satisfying safety level.

Since two gas generating chambers are provided, this hybrid inflator may also be adapted to an embodiment in which a combustion gas is generated only in the first gas generating chamber 120, an embodiment in which combustion gases are generated in the first and second gas generating chambers 120 and 130 simultaneously, and an embodiment in which an interval between the times of generating respective combustion gases in the first gas generating chamber 120 and the second gas generating chamber 130 may be adjusted optionally.

What is claimed is:

1. A hybrid inflator for an inflating-type safety system of a vehicle provided with an air bag, comprising:

an inflator housing charged with a pressurized medium containing an inert gas;

ignition means provided inside the inflator housing;

a gas generator accommodated in the inflator housing, the gas generator including, a gas generator housing constituting an outer shell of the gas generator, the gas generator housing including a charge-transferring chamber formed inside a cylindrical charge-transferring chamber housing provided longitudinally in an extension of the ignition means, a gas generating chamber defined by the charge-transferring chamber housing and the gas generator housing, and storing gas generating means therein, the gas generating chamber having a plurality of communication holes communicating with the interior of inflator housing, the charge-transferring chamber housing having a plurality of flame-transferring holes provided at intervals in the longitudinal direction to make the charge-transferring chamber and the gas generating chamber communicate with each other; and at least some of the plurality of flame-transferring holes and the communication holes are arranged not to face each other opposingly in the longitudinal direction;

a spare communication hole that penetrates a wall surface of the gas generator housing where the gas generating chamber, or a first gas generating chamber and a second gas generating chamber do not exist; and an ignition means chamber provided with the ignition means.

2. A hybrid inflator according to claim 1, wherein the plurality of flame-transferring holes and the plurality of the communication holes or the first communication holes are provided evenly along a longitudinal direction of the gas generating chamber or the first gas generating chamber.

3. A hybrid inflator according to claim 1, wherein the plurality of flame-transferring holes and the communication holes, or the plurality of flame-transferring holes and the first communication holes are arranged at equal intervals.

4. A hybrid inflator according to claim 1, wherein the spare communication hole serves as a spare passage for discharging the pressurized medium and a combustion gas out of the hybrid inflator.

5. A hybrid inflator according to claim 1, wherein a boss is arranged on one end of the hybrid inflator, the ignition means is disposed in the ignition means chamber formed in the boss, charge-transferring means to be ignited and burnt by the ignition means is disposed in the charge-transferring chamber housing, and one end of the charge-transferring chamber housing is fixed by the boss.

6. A hybrid inflator according to claim 5, wherein one end of the charge-transferring chamber housing has a skirt portion expanded in the radial direction, the charge-transferring means is inserted into the skirt portion, and the periphery of the skirt portion is crimped from the outside by an annular projecting portion integrated with the boss.

7. A hybrid inflator according to claim 5, wherein one end of the charge-transferring chamber housing has a bent portion bent outwardly in the radial direction, the charge-transferring means is inserted into the one end formed with the bent portion in the charge-transferring chamber housing, and the periphery of the bent portion is crimped from the outside by an annular projecting portion integrated with the boss.

8. A hybrid inflator according to claim 6 or 7, wherein the skirt portion and the annular projecting portion, or the bent portion and the annular projecting portion contact with each other to adhere closer by a force against a force applied in the longitudinal direction of the hybrid inflator.

9. An air bag system, comprising:
activation signal-outputting means including an impact sensor and a control unit; and
a module case accommodating a hybrid inflator according to claim 1, and an air bag.

10. A hybrid inflator for an inflating-type safety system of a vehicle provided with an air bag, comprising:
an inflator housing charged with a pressurized medium containing an inert gas;
ignition means provided within the inflator housing;
a gas generator accommodated in the inflator housing, the gas generator including,
a gas generator housing constituting an outer shell of the gas generator, the gas generator housing including a charge-transferring chamber formed inside a cylindrical charge-transferring chamber housing provided longitudinally in an extension of the ignition means, the charge-transferring chamber housing having a plurality of flame-transferring holes provided at intervals in the longitudinal direction,
a first gas generating chamber and a second gas generating chamber defined by the charge-transferring chamber housing and the gas generator housing, each of the first gas generating chamber and the second gas generating chamber storing solid gas generating agent therein,
the charge-transferring chamber housing having a plurality of flame-transferring holes provided at intervals in the longitudinal direction to make the charge-transferring chamber and the first gas generating chamber communicating with each other, and the first gas generating chamber and the second gas generating chamber being provided with a plurality of first communication holes and a plurality of second communication holes which communicate with the interior of inflator housing respectively, and
at least some of a plurality of the flame-transferring holes and the first communication holes being arranged not to face each other opposingly in the longitudinal direction; and
an ignition means chamber provided with the ignition means.

11. A hybrid inflator according to claim 1 or 10, wherein at least some of the plurality of flame-transferring holes and the communication holes, or at least some of the plurality of flame-transferring holes and the first communication holes are arranged not to face each other opposingly in the longitudinal direction and arranged not to face each other opposingly in the widthwise direction.

12. A hybrid inflator according to claim 10, further comprising:
a first retainer disposed on a first end of the first gas generating chamber, and
a second retainer disposed on a second end of the first gas generating chamber between the first gas generating chamber and the second gas generating chamber, such that respective distances in the longitudinal direction of the first gas generating chamber and the second gas generating chamber are adjusted by the first retainer and the second retainer.

13. A hybrid inflator according to claim 12, wherein each of the first retainer and the second retainer includes a combination of a larger-diameter cylinder having one end surface closed and the other end surface open, a smaller-diameter cylinder formed integrally with the larger-diameter cylinder to project towards the inside and the opening portion of the larger-diameter cylinder and has both end surfaces open, and an annular member provided between the larger-diameter cylinder and the smaller-diameter cylinder.

14. A hybrid inflator according to claim 13, wherein the annular member provided between the larger-diameter cylinder and the smaller-diameter cylinder is formed integrally with the closed end surface to project towards the opening portion or is formed separately and arranged.

15. A hybrid inflator according to claim 7 or 14, wherein, in the retainer, a height of the side wall of the larger-diameter cylinder is highest and a height of the annular member is lowest.

16. A hybrid inflator according to claim 13, wherein the first retainer is arranged such that the closed end surface is positioned in the first gas generating chamber side, and the second retainer is arranged such that the opening portion is positioned in the first gas generating chamber side.

17. A hybrid inflator for an inflating-type safety system of a vehicle provided with an air bag, comprising:
an inflator housing charged with a pressurized medium including an inert gas;
a gas generator accommodated in the inflator housing, the gas generator including,
a gas generator housing constituting an outer shell of the gas generator, the gas generator housing including a charge-transferring chamber formed inside a cylindrical charge-transferring chamber housing provided longitudinally in an extension of one ignition means,
a first gas generating chamber and a second gas generating chamber defined by the charge-transferring chamber housing and the gas generator housing, each storing gas generating means therein, a first retainer disposed on a first end of the first gas generating chamber, and a second retainer disposed on a second end of the first gas generating chamber between the first gas generating chamber and the second gas generating chamber, such that respective distances in the longitudinal direction of the first gas generating chamber and the second gas generating chamber are adjusted by the first retainer and the second retainer, each of the first retainer and the second retainer including a combination of a larger-diameter cylinder having one end surface closed and the other end surface open, a smaller-diameter cylinder being formed integrally with the larger-diameter cylinder to project towards the inside and the opening portion of the larger-diameter cylinder and having both end faces open, and an annular member being provided between the larger-diameter cylinder and the smaller-diameter cylinder; and an ignition means chamber provided with an ignition means connected to the gas generator.

18. A hybrid inflator according to claim 17, wherein the annular member provided between the larger-diameter cylinder and the smaller-diameter cylinder is integrally with the closed end surface to project towards the opening portion or formed separately and arranged.

19. A hybrid inflator according to claim 17 or 18, wherein, in the retainer, a height of the side wall of the larger-diameter cylinder is highest and a height of the annular member is lowest.

20. A hybrid inflator according to claim 17, wherein the first retainer is arranged such that the closed end surface is positioned in the first gas generating chamber side and the second retainer is arranged such that the opening portion is positioned in the first gas generating chamber side.

21. A hybrid inflator for an inflating-type safety system of a vehicle provided with an air bag, comprising:

an inflator housing charged with a pressurized medium containing an inert gas;

a gas generator accommodated in the inflator housing, the gas generator including, a gas generator housing constituting an outer shell of the gas generator, the gas generator housing including a charge-transferring chamber formed inside a cylindrical charge-transferring chamber housing provided longitudinally in an extension of one ignition means, at least one gas generating chamber defined by the charge-transferring chamber housing and the gas generator housing, and storing gas generating means therein, and a spare communication hole that penetrates a wall of the gas generator housing and formed where the gas generating chamber is not provided; and an ignition means chamber provided with ignition means connected to the gas generator.

22. A hybrid inflator according to claim 21, wherein the spare communication hole serves as a spare passage for discharging the pressurized medium and a combustion gas from the hybrid inflator.

23. A hybrid inflator for an inflating-type safety system of a vehicle provided with an air bag, comprising:

an inflator housing charged with a pressurized medium containing an inert gas;

a gas generator accommodated in the inflator housing, the gas generator including, a gas generator housing constituting an outer shell of the gas generator, the gas generator housing including a charge-transferring chamber formed inside a cylindrical charge-transferring chamber housing provided longitudinally in an extension of at least one ignition means, a first gas generating chamber and a second gas generating chamber defined by the charge-transferring chamber housing and the gas generator housing, each of the first gas generating chamber and the second gas generating chamber storing solid gas generating agent therein, and a spare communication hole that penetrates a wall of the gas generator housing and formed where the first gas generating chamber and the second gas generating chamber are not provided; and a boss disposed at one end of the inflator housing and provided with an ignition means chamber accommodating the at least one ignition means connected to the gas generator, wherein charge-transferring means adapted to be ignited and burnt by the ignition means is disposed in the charge-transferring chamber housing, and one end of the charge-transferring chamber housing has a skirt portion expanding in the radial direction, the charge-transferring means is inserted into the skirt portion, and the periphery of the skirt portion is crimped from the outside by an annular projecting portion integrated with the boss, or one end of the charge-transferring chamber housing has a bent portion bent outwardly in the radial direction, the charge-transferring means is inserted into one end formed with the bent portion in the charge-transferring chamber housing, and the periphery of the bent portion is crimped from the outside by the annular projecting portion integrated with the boss.

24. A hybrid inflator according to claim 23, wherein the skirt portion and the annular projecting portion, or the bent portion and the annular projecting portion contact with each other to adhere closer by a force against a force applied in the longitudinal direction of the hybrid inflator.

* * * * *